(12) United States Patent
Yeun

(10) Patent No.: US 12,025,737 B2
(45) Date of Patent: Jul. 2, 2024

(54) LiDAR DEVICE

(71) Applicant: Yong-Hyun Yeun, Daejeon (KR)

(72) Inventor: Yong-Hyun Yeun, Daejeon (KR)

( * ) Notice: Subject to any disclaimer, the term of this patent is extended or adjusted under 35 U.S.C. 154(b) by 992 days.

(21) Appl. No.: 16/322,873

(22) PCT Filed: Jul. 31, 2017

(86) PCT No.: PCT/KR2017/008220
§ 371 (c)(1),
(2) Date: Mar. 5, 2019

(87) PCT Pub. No.: WO2018/026147
PCT Pub. Date: Feb. 8, 2018

(65) Prior Publication Data
US 2021/0389424 A1 Dec. 16, 2021

(30) Foreign Application Priority Data
Aug. 2, 2016 (KR) .......................... 10-2016-0098492

(51) Int. Cl.
*G01S 7/48* (2006.01)
*G01S 7/481* (2006.01)
*G01S 17/89* (2020.01)

(52) U.S. Cl.
CPC ............. *G01S 7/4811* (2013.01); *G01S 17/89* (2013.01)

(58) Field of Classification Search
CPC ...... G01S 7/481; G01S 7/4811; G01S 7/4812; G01S 7/4865; G01S 17/89; G02B 5/26
See application file for complete search history.

(56) References Cited

U.S. PATENT DOCUMENTS

| | | | |
|---|---|---|---|
| 3,860,342 A * | 1/1975 | Orloff | G01S 17/50 356/28 |
| 6,664,529 B2 | 12/2003 | Pack et al. | |
| 7,760,334 B1 * | 7/2010 | Evans | G01S 7/4802 356/141.5 |
| 8,836,922 B1 | 9/2014 | Pennecot et al. | |
| 9,874,635 B1 * | 1/2018 | Eichenholz | G01S 7/4815 |
| 2002/0054433 A1 * | 5/2002 | Tacklind | G02B 27/1073 359/627 |

(Continued)

FOREIGN PATENT DOCUMENTS

| | | | | |
|---|---|---|---|---|
| CN | 103616698 A * | 3/2014 | ............. | G01S 17/95 |
| CN | 104251995 A * | 12/2014 | ............. | G01S 17/89 |

(Continued)

OTHER PUBLICATIONS

Korean Intellectual Property Office, Office Action Issued in Application No. 10-2016-0098492, Jul. 23, 2020, 10 pages.

(Continued)

*Primary Examiner* — Hovhannes Baghdasaryan
(74) *Attorney, Agent, or Firm* — McCoy Russell LLP

(57) ABSTRACT

The present invention relates to a lidar device for measuring a distance of an external object using light. According to the present invention, the transmission mirror and the reception mirror are integrally formed, and a shadow region, which has not been conventionally used, is utilized as a light transmission region such that a separate light transmission space is unnecessary, thereby enabling a minimized design of the lidar device.

3 Claims, 8 Drawing Sheets

(56) References Cited

U.S. PATENT DOCUMENTS

| | | | | |
|---|---|---|---|---|
| 2004/0107588 A1* | 6/2004 | Pu | ........................ | G01C 15/002 |
| | | | | 33/286 |
| 2007/0046945 A1* | 3/2007 | Schwiesow | ............... | G01P 5/26 |
| | | | | 356/451 |
| 2012/0327662 A1* | 12/2012 | Dang | ................ | G02B 19/0028 |
| | | | | 362/343 |
| 2014/0043309 A1* | 2/2014 | Go | ........................ | G01S 7/4817 |
| | | | | 345/207 |

FOREIGN PATENT DOCUMENTS

| | | | |
|---|---|---|---|
| JP | 2013195302 | A | 9/2013 |
| KR | 100657562 | B1 * | 12/2006 |
| KR | 100657562 | B1 | 12/2006 |
| KR | 1020110113055 | A | 10/2011 |
| KR | 1020120059314 | A | 6/2012 |
| KR | 1020140020657 | A | 2/2014 |
| KR | 1020150116239 | A | 10/2015 |

OTHER PUBLICATIONS

ISA Korean Intellectual Property Office, International Search Report Issued in Application Serial No. PCT/KR2017/008220, Nov. 9, 2017, WIPO, 4 pages.

* cited by examiner

SPATIAL-CORRECTED GENERAL IMAGE

LiDAR DEVICE

CROSS REFERENCE TO RELATED APPLICATION

The present application is a Continuation-in-Part of International Patent Application No. PCT/KR2017/008220, entitled "LIDAR DEVICE," filed on Jul. 31, 2017. International Patent Application No. PCT/KR2017/008220 claims priority to Korean Patent Application No. 10-2016-0098492 filed on Aug. 2, 2016. The entire contents of each of the above-identified applications are hereby incorporated by reference in their entirety for all purposes.

TECHNICAL FIELD

The present invention relates to a lidar device for measuring a distance of an external object using light.

BACKGROUND ART

Light detection and ranging (LiDAR) refers to measuring a distance by detecting a time of flight or a phase difference of light received from an external object after illuminating the external object with light.

The lidar is similar to radio detection and ranging (RADAR) which uses radio waves in a measuring method, but there is a difference in that the lidar uses light instead of the radio waves, and for this reason, the lidar is also called 'image radar'. In addition, the lidar has characteristics of superior spatial resolution and resolution compared to the radar.

In addition, the lidar is also utilized as an application to measure various physical properties such as atmosphere velocity or component analysis using light.

With the recent remarkable development in laser optics and semiconductor processes, the lidar, which has been restrictively used only in special fields such as aviation and satellite fields, has expanded to various fields such as civilian and defense field robots such as surveillance and reconnaissance, unmanned surface vessels, aircraft such as drone, industrial security, and safety. In particular, research on the lidar applicable to autonomous driving has recently been actively carried out.

A lidar device usually includes a light source, a transmission optical system for transmitting light, a reception optical system for receiving light, and a photodetector for detecting a time of flight or a phase difference between the transmission light and the reception light to measure a distance, and may generate three-dimensional (3D) image data within a given field of view (FOV).

However, in the conventional lidar device, the transmission optical system for transmitting the light emitted from the light source and the reception optical system for receiving the light reflected by the external object are separately configured. In addition, in order to implement a wide FOV, an expensive wide-angle lens should be used for the transmission optical system and the reception optical system, respectively, and there is a problem in that it is very costly to implement the lidar device in such a manner.

RELATED ART DOCUMENT

Patent Document

U.S. Pat. No. 8,836,922 (2014.09.16)

DISCLOSURE

Technical Problem

An object of the present invention is to provide a lidar device capable of being miniaturized and implementing a wide field of view by integrating a transmission space and a reception space of light.

In addition, an object of the present invention is to provide a lidar device capable of simultaneously acquiring a distance-based 3D image and a general image without a separate matching algorithm.

Technical Solution

In one general aspect, a lidar device includes: a light source for emitting light of a predetermined wavelength band; a transmission mirror provided on an optical path on which the light of the predetermined wavelength band proceeds, and reflecting the light of the predetermined wavelength band to be incident in a predetermined angle range; a reception mirror integrally provided with the transmission mirror and receiving light from an outside; a light detection unit for detecting a transmission/reception time of flight or phase difference of the light of the predetermined wavelength band to acquire a distance-based 3D image; and a first mirror provided between the light source and the transmission mirror, and reflecting the light received by the reception mirror to the light detection unit.

The lidar device may further include an image acquisition unit for acquiring an image; and a second mirror provided between the light source and the transmission mirror, and reflecting the light received by the reception mirror to the image acquisition unit, wherein the first mirror reflects the light of the predetermined wavelength band and transmits light having a wavelength band other than the predetermined wavelength band, and the second mirror reflects light having a wavelength band other than the predetermined wavelength band and transmits the light of the predetermined wavelength band.

The first mirror may include a first light transmission unit on the optical path of the light source, and the second mirror may include a second light transmission unit on the optical path of the light source.

Advantageous Effects

According to the present invention, by integrating the transmission mirror and the reception mirror and utilizing the conventional unused shaded area as the optical transmission area, there is an advantage in that it is possible to minimize the design of the lidar device because the separate optical transmission space is unnecessary.

In addition, according to the present invention, by adopting the mirror structure instead of an expensive wide angle lens for securing the conventional wide field of view (FOV), there is an advantage that the lidar device may be manufactured at low cost.

In addition, according to the present invention, there is an advantage in that the actual general image may be acquired simultaneously with the distance-based 3D image of the external object and the acquired image may be utilized in the real world based 3D modeling.

BEST MODE

Hereinafter, a lidar device according to the present device will be described in detail with reference to the accompanying drawings. The accompanying drawings are provided by way of example in order to sufficiently transfer the spirit of the present invention to those skilled in the art, and the present invention is not limited to the accompanying drawing provided below, but may be implemented in other forms.

When a lidar device according to the present invention emits light of a predetermined wavelength band and the light of the predetermined wavelength band is then reflected by an external object, the lidar device receives the reflected light of the predetermined wavelength band to measure a distance of the external object.

Figure 1:
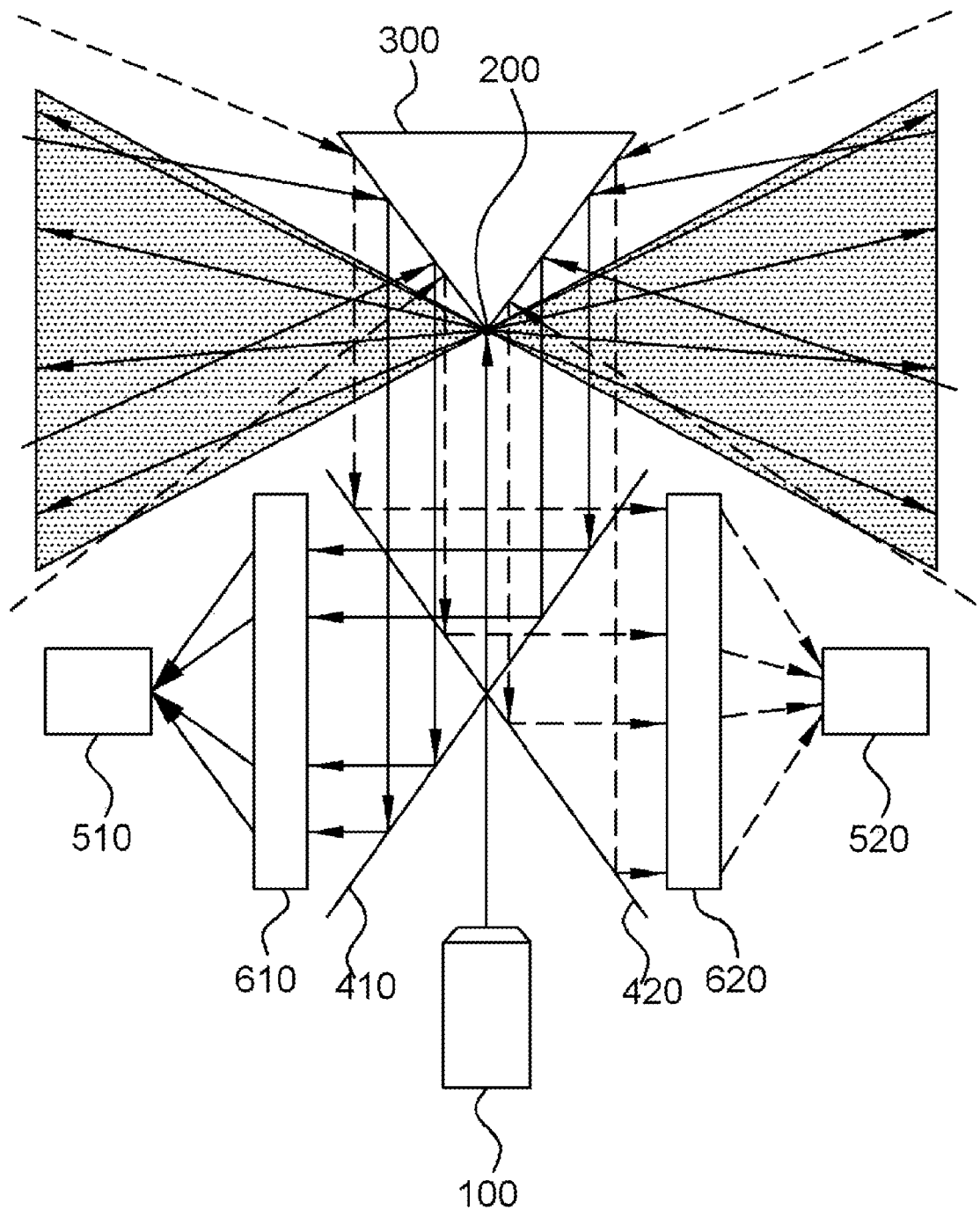
FIG. 1 is a view illustrating a lidar device according to an exemplary embodiment of the present invention.
Figure 2:
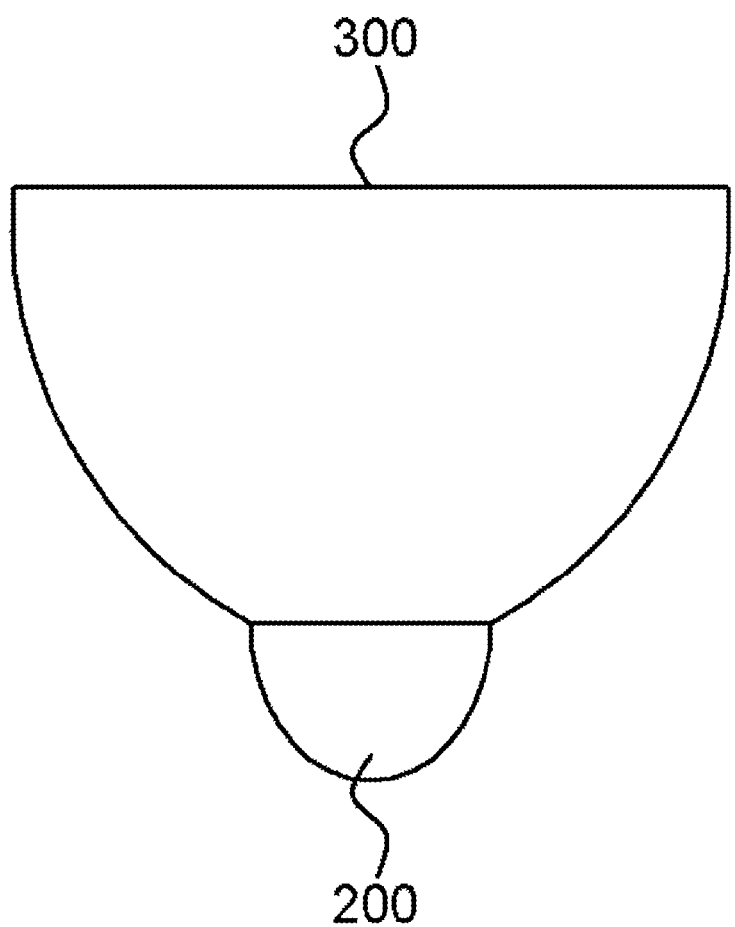
FIG. 2 is an example of a transmission mirror and a reception mirror of the lidar device illustrated in FIG. 1.

Referring to FIGS. 1 and 2, a lidar device according to an exemplary embodiment of the present invention may include a light source 100, a transmission mirror 200, a reception mirror 300, a first mirror 410, a second mirror 420, a light detection unit 510, an image acquisition unit 520, a first lens unit 610, and a second lens unit 620.

First, the light source 100 emits light of a predetermined wavelength band in order to measure a distance of an external object (not shown) existing outside the lidar device, and may preferably emit laser light or light emitting diode (LED) light with good linearity.

The transmission mirror 200 is provided on a path of the light emitted from the light source 100 and reflects the light emitted from the light source 100 to the outside in a predetermined angle range (i.e., a range of field of view (FOV)). FIGS. 1 to 4 illustrate a case in which a horizontal FOV is omnidirectional (360 degrees).

The transmission mirror 200 may be designed in various forms according to a required field of view (FOV) as a mirror of a con or axicon structure, and may be formed of a dichroic mirror so that only light of a predetermined wavelength band emitted from a total reflection or the light source 100 is selectively reflected.

The reception mirror 300 is a mirror for receiving light reflected from the external object. The reception mirror 300 may be designed in various forms according to the required field of view (FOV) as a con or axicon mirror, similarly to the transmission mirror 200, and may be formed of a dichroic mirror or a total reflection mirror.

FIG. 2 is an example of the transmission mirror 200 and the reception mirror 300. As illustrated in FIG. 2, the transmission mirror 200 and the reception mirror 300 may be separately or integrally configured. In addition, the reception mirror 300 may be designed in a miniature similar figure to the transmission mirror 200.

FIG. 5 illustrates a distance-based 3D image and a general image which are acquired by the lidar device, respectively, where an area A represents a shaded area, an area B represents an actually measured or photographed area, and an area C represents an area out of a design field of view (FOV).

Referring to FIG. 5, the present invention has an advantage in that it is possible to design miniaturization of the lidar device because a separate space is not required for an light transmission optical system by utilizing an area (shaded area) in which the transmission mirror 200 is not actually used as a light transmission area.

The transmission mirror 200 and the reception mirror 300 may be integrally formed by processing one mirror, or may be integrally formed by processing two mirrors, respectively, and then bonding the two mirrors to each other.

Meanwhile, the first mirror 410 and the second mirror 420 may be formed of a dichroic mirror or a dichroic prism that reflects only light of a specific wavelength band and transmits light of other wavelength bands.

Specifically, the first mirror 410 reflects only light of a predetermined wavelength band emitted from the light source 100 among the light reflected by the reception mirror 300 and transmits light having a wavelength band other than the predetermined wavelength band. On the contrary, the second mirror 420 transmits light of a predetermined wavelength band emitted from the light source 100 among the light reflected by the reception mirror 300 and reflects light having a wavelength band other than the predetermined wavelength band.

Meanwhile, in order to transmit the light emitted from the light source 100 as it is, a first transmission unit (not shown) is formed on the path of the light emitted from the light source 100 in the first mirror 410, and a second transmission unit (not shown) is formed on the path of the light emitted from the light source 100 in the second mirror 410. Here, the first transmission unit and the second transmission unit refer to fine holes or non-mirror-coated transparent regions through which the light emitted from the light source 100 may be transmitted. Light of a predetermined wavelength band emitted from the light source 100 through the first transmission unit and the second transmission unit is transmitted through the first mirror 410 and the second mirror 420 as it is without loss of light.

The light detection unit 510 is configured in a form in which a two-dimensional time of flight (TOF) sensor for distance measurement or a single light receiving element (a photodiode (PD), an avalanche photodiode (APD), etc.) is two-dimensionally arranged, and measures the distance of the external object by detecting a time of flight or a phase difference of transmission/reception light proportional to the distance of the external object.

The image acquisition unit 520 acquires an image of the external object using the light reflected through the reception mirror 300 and the second mirror 420, and may correspond to an image sensor (CCD, RGB-IR, or the like).

The first lens unit 610 is disposed between the first mirror 410 and the light detection unit 510 and performs a focusing function. In addition, the second lens unit 620 is disposed between the second mirror 420 and the image acquisition unit 520 and performs a focusing function.

Figure 3:
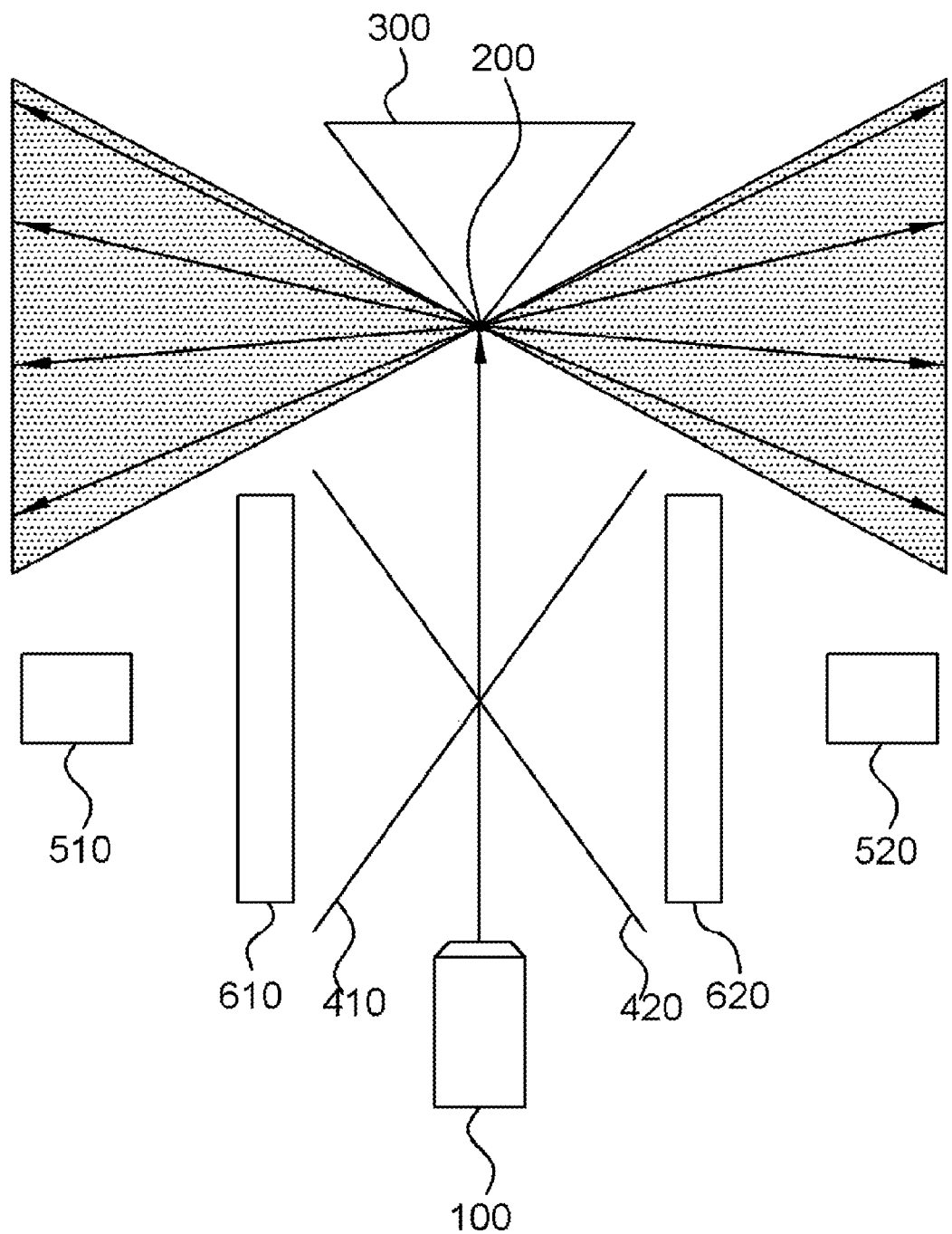
FIG. 3 is a view illustrating a light transmission path of the lidar device illustrated in FIG. 1.
Figure 4:
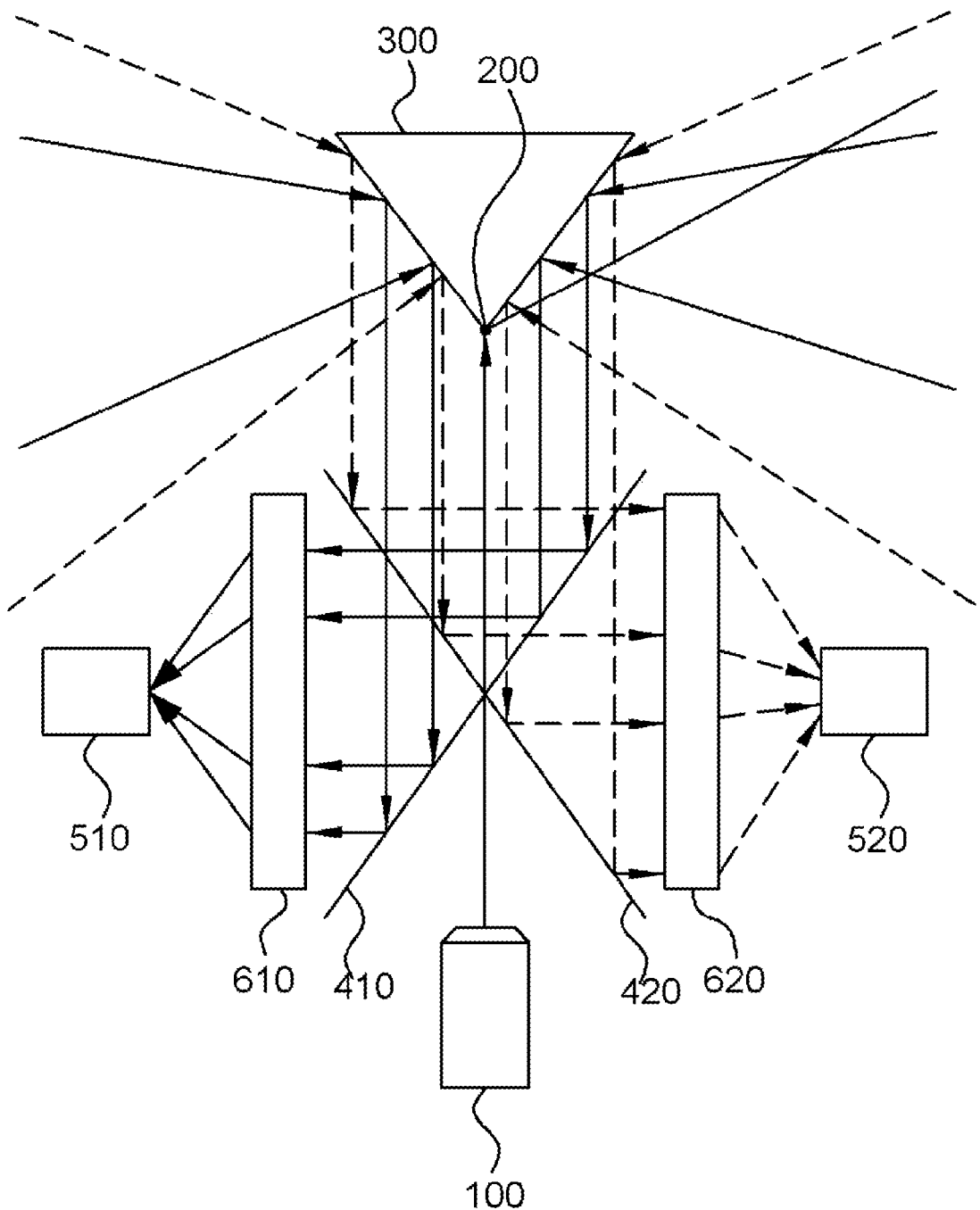
FIG. 4 is a view illustrating a light reception path of the lidar device illustrated in FIG. 1.

Hereinafter, an operation of the lidar device will be described with reference to FIGS. 3 to 5.

First, a light transmission process will be described, and the light of the predetermined wavelength band emitted from the light source 100 is transmitted through the first mirror 410 and the second mirror 420 through the first transmission unit and the second transmission unit, is incident on the transmission mirror 200, and is then transmitted toward the external object through the transmission mirror 200. In this case, the transmission mirror 200 reflects the light in a predetermined area with a designed horizontal and vertical field of view.

Figure 5A:
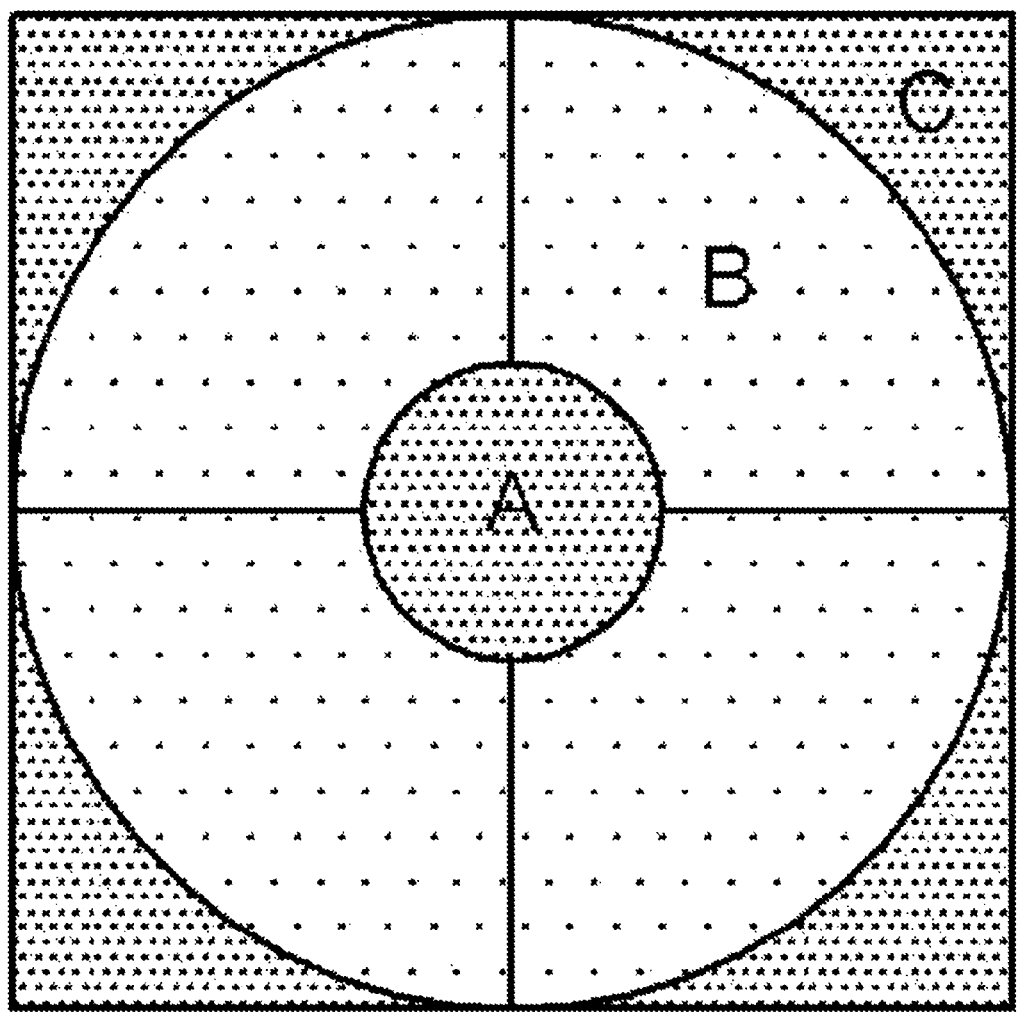
FIG. 5 is a view illustrating a distance-based 3D image and a general image which are acquired by the lidar device, respectively.

Next, a light reception process will be described, and the light transmitted toward the external object is reflected by the external object, and is then incident on the reception mirror 300. Thereafter, only the light of the predetermined wavelength band emitted from the light source 100 is reflected by the first mirror 410 and is incident on the light detection unit 510, and accordingly, the light detection unit 510 acquires a distance-based 3D image as shown in FIG. 5A based on the distance of the external object. In addition, the light having the wavelength band other than the predetermined wavelength band emitted from the light source 100 is incident on the image acquisition unit 520 through the reception mirror 300 and the second mirror 420, and accordingly, the image acquisition unit 520 acquires a general image of the external object as shown in FIG. 5B.

Figure 5B:
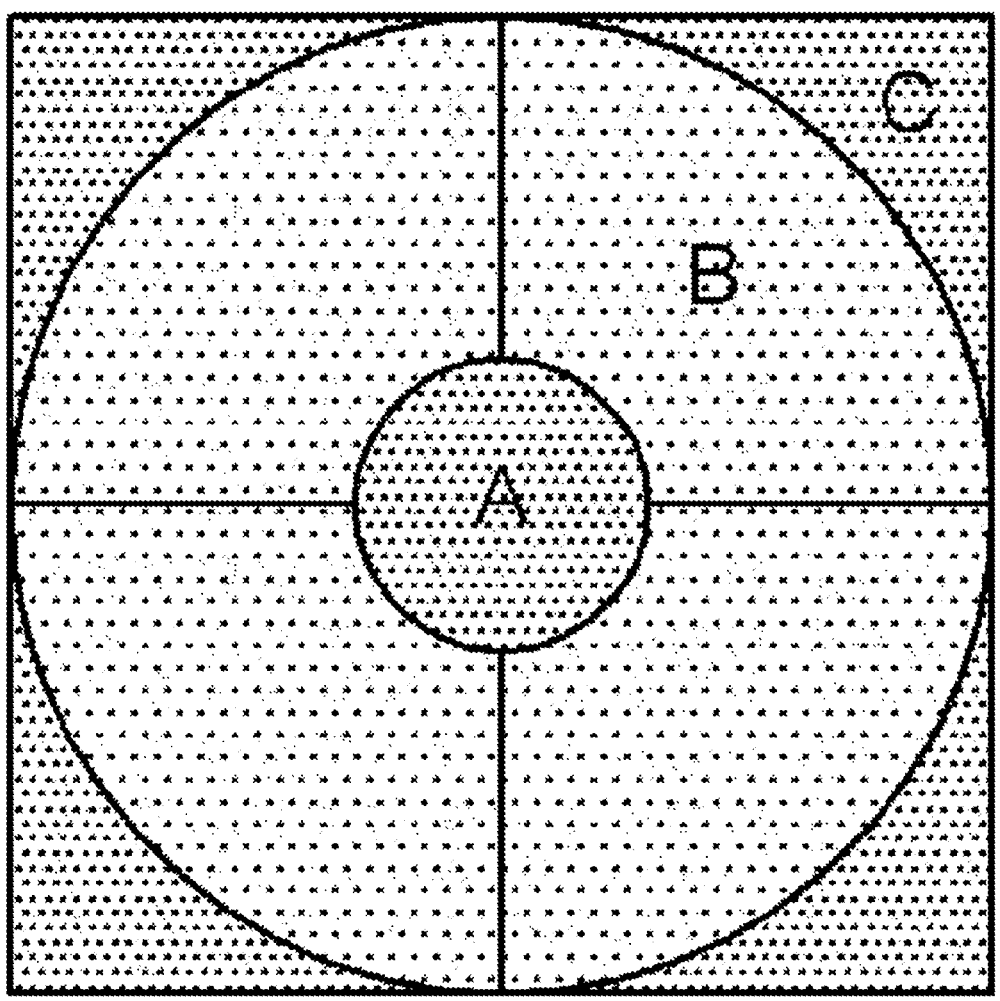
Figure 5C:
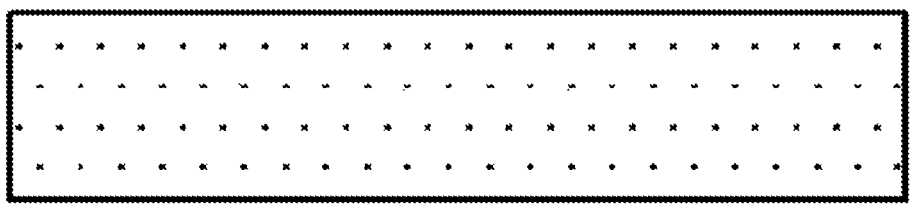
Figure 5D:
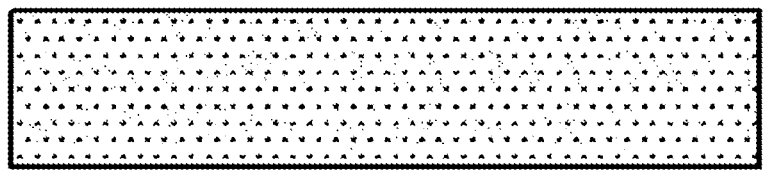

FIG. 5C illustrates a 3D image acquired by space-correcting the 3D image shown in FIG. 5A through a spatial correction algorithm and FIG. 5D illustrates a general image acquired by space-correcting the general image shown in FIG. 5B through a spatial correction algorithm.

As described above, the lidar device according to the present invention may simultaneously acquire the distance-based 3D image together with the general image of the external object, and has an advantage that it may be utilized for actual image based 3D modeling based on the simultaneously acquired 3D image and general image.

In addition, by utilizing the shaded area A shown in FIGS. 5A and 5B as the light transmission area, it is advantageous in that it is possible to manufacture a miniaturized lidar device because a separate transmission space is not required.

Hereinabove, although the exemplary embodiments of the present invention have been described by way of example with reference to the accompanying drawings, the present invention is not limited to the exemplary embodiments, but may be variously modified and altered by those skilled in the art without departing from the spirit and scope of the present invention.

In particular, in a case in which it is intended to acquire only the distance-based 3D image, it is apparent that the components of the second mirror 420, the second lens unit 620, and the image acquisition unit 520 described above may be excluded.

In addition, although the exemplary embodiment of the present invention has been described by way of an example of the lidar device in which the horizontal field of view (FOV) may measure omnidirectional (360 degrees), it is apparent that the lidar device may be designed and modified to have any horizontal field of view (FOV).

DESCRIPTION OF REFERENCE NUMERALS

100: light source
200: transmission mirror
300: reception mirror
410: first mirror
420: second mirror
510: light detection unit
520: image acquisition unit
610: first lens unit
620: second lens unit

The invention claimed is:
1. A lidar device comprising:
a light source for emitting light of a predetermined wavelength band;
a transmission minor provided on an optical path on which the light of the predetermined wavelength band proceeds, and reflecting the light of the predetermined wavelength band to be incident in a predetermined angle range;
a reception minor receiving light reflected from the external object, wherein the reception minor is integrally provided with the transmission mirror and receives light from an outside;
a light detection unit for detecting a transmission/reception time of flight or phase difference of the light of the predetermined wavelength band to acquire a distance-based 3D image, the light detection unit configured to use a shaded area in a center of the distance-based 3D image as a light transmission area; and
a first mirror provided between the light source and the transmission minor, and reflecting the light received by the reception minor to the light detection unit,
wherein the first minor transmits the light of the predetermined wavelength band emitted from the light source as it is, such that the light of the predetermined wavelength band emitted from the light source is transmitted through the first minor as it is, and then is transmitted toward the external object through the transmission mirror,
wherein the first mirror reflects only light of the predetermined wavelength band emitted from the light source among the light reflected by the reception minor toward the light detection unit in one direction, and transmits light having a wavelength band other than the predetermined wavelength band, which is emitted from the light source among the light reflected by the reception mirror,
wherein the transmission minor is designed as a minor of a cone structure such that the light of the predetermined wavelength band emitted from the light source has a horizontal angle of view of 360 degrees, and the reception minor is designed as a minor of a cone structure, and
in the case that the light of the predetermined wavelength band emitted from the light source is emitted into the transmission minor, the transmission minor reflects the light of the predetermined wavelength band to have a horizontal angle of view of 360 degrees.

2. The lidar device of claim 1, further comprising:
an image acquisition unit for acquiring an image; and
a second mirror provided between the light source and the transmission mirror, and reflecting the light received by the reception minor to the image acquisition unit,
wherein the second mirror reflects light having a wavelength band other than the predetermined wavelength band, which is emitted from the light source among the light reflected by the reception minor toward the image acquisition unit in one direction, and transmits the light of the predetermined wavelength band, which is emitted from the light source among the light reflected by the reception minor.

3. The lidar device of claim 2, wherein the second minor transmits the light of the predetermined wavelength band emitted from the light source as it is, such that the light of the predetermined wavelength band emitted from the light source is transmitted through the second mirror as it is, and then, is transmitted toward the external object through the transmission minor.

* * * * *